United States Patent [19]
Grosch

[11] Patent Number: 5,317,543
[45] Date of Patent: May 31, 1994

[54] METHOD AND SENSOR FOR DETERMINING THE DISTANCE OF SOUND GENERATING TARGETS

[75] Inventor: Hermann Grosch, Wülfrath, Fed. Rep. of Germany

[73] Assignee: Rheinmetall GmbH, Ratingen, Fed. Rep. of Germany

[21] Appl. No.: 1,722

[22] Filed: Jan. 7, 1993

[30] Foreign Application Priority Data

Jan. 7, 1992 [DE] Fed. Rep. of Germany ....... 4200170

[51] Int. Cl.$^5$ ............................................. G01S 11/14
[52] U.S. Cl. .................................... 367/125; 367/124
[58] Field of Search ................ 367/124, 125, 126, 127, 367/96; 181/125; 102/427

[56] References Cited

U.S. PATENT DOCUMENTS 5,099,456  3/1992  Wells ................................... 367/127

*Primary Examiner*—Daniel T. Pihulic
*Attorney, Agent, or Firm*—Spencer, Frank & Schneider

[57] ABSTRACT

A method and to a sensor for determining the distance of sound generating targets, preferably wheeled or track-laying vehicles, from acoustic signals which are subjected to a Fourier transformation. In order to determine the target distance easily and reliably, it is provided that the acoustic signals received by an acoustic sensor at two successive points in time from a target that is at a distance $r_1$ and $r_2$, respectively, from the acoustic sensor are employed, after the Fourier transformation, for an evaluation of the phase difference in the sound spectrum which yields the difference between the distances of the target from the sensor at the two points in time, from which difference the target distance is then calculated according to the spherical wave model.

7 Claims, 2 Drawing Sheets

METHOD AND SENSOR FOR DETERMINING THE DISTANCE OF SOUND GENERATING TARGETS

CROSS REFERENCE TO RELATED APPLICATION

This application claims the priority of application Ser. No. P 42 00 170.6, filed Jan. 7, 1992, in the Federal Republic of Germany, the subject matter of which is incorporated herein by reference.

BACKGROUND OF THE INVENTION

The present invention relates to a method and to a sensor for determining the distance of sound generating targets with respect to the sensor by means of acoustic signals subjected to a Fourier transformation.

DE-OS (German Unexamined Published Patent Application) 3,936,359 discloses the use of a sensor arrangement composed of a plurality of sensors to determine the direction and distance of sound generating targets, with acoustic sensors being employed to determine the target direction. A seismic sensor is additionally employed to determine the target distance. A line characteristic of the target in the air and ground sound spectra is measured and the Doppler shift between these lines as well as the propagation speed of the corresponding waves are used to calculate the radial target velocity and from it, under consideration of the bearing angle, the target distance. Aside from the fact that a number of sensors are required to determine the target distance, the propagation speed of sound waves in the ground relative to the propagation speed of sound waves in the air fluctuates greatly depending on the type of ground involved so that this propagation speed must be determined which requires the formation of a cross spectrum of the signals received from two sensors.

SUMMARY OF THE INVENTION

It is an object of the present invention to provide a method and a sensor for determining the distance of sound generating targets with respect to the sensor by means of acoustic signals subjected to a fourier transformation which are simpler in operation and thus more reliable and faster without having a preferred direction.

The above object generally is achieved according to one aspect of the present invention, by a method for determining a target distance of sound generating targets, preferably wheeled or track-laying vehicles, from acoustic signals that are subjected to a Fourier transformation, comprising the steps of: receiving acoustic signals with an acoustic sensor at two successive points in time from a target that is at a first distance $r_1$ and a second distance $r_2$, respectively, from the acoustic sensor; subjecting the received acoustic signals to a Fourier transformation to provide respective transformed acoustic signals; determining the phase difference in the sound spectrum of the transformed acoustic signals and evaluating the phase difference in the sound spectrum to yield the difference between the distances of the target from the sensor at the two points in time; and, calculating the target distance from the difference between the distances according to the spherical wave model.

The above object generally is achieved according to a further aspect of the present invention by an acoustic sensor arrangement including an electronic evaluation system for carrying out the above method.

DETAILED DESCRIPTION OF THE PREFERRED EMBODIMENT

The propagation of sound signals in air is subject to geometrical as well as atmospheric attenuation. The atmospheric attenuation, whose value is a function of frequency, can be neglected for the frequency and distance ranges of interest so that the attenuation is determined essentially by the geometric propagation attenuation. In this connection, the targets can be considered, in approximation, as point sources (usual target distances up to about 300 m) and thus the propagating sound waves as spherical waves whose amplitude drops proportionally to $1/r$ while their signal power drops proportionally to $1/r^2$. If the sound spectrum radiated by targets is assumed to be constant for target movement paths (armored vehicles and the like) of $<10$ m, the distance of the target from the sensor can be calculated by way of a determination of the signal power (sum power or spectral power density) and the associated phase spectrum at two suitable points.

Figure 1:
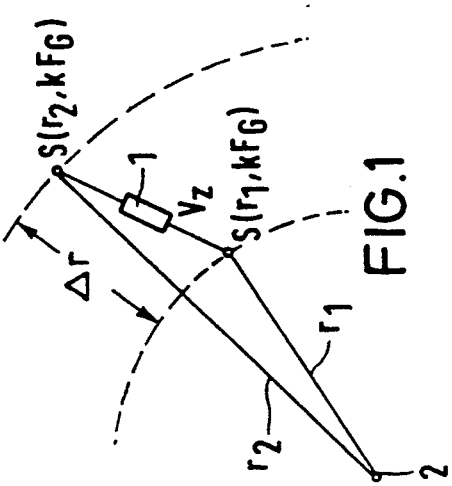

FIG. 1 shows a target 1 which at time $t_1$ has a distance $r_1$ and at time $t_2$ a distance $r_2$ from an acoustic sensor 2 (microphone). The radial distance between the two points is $\Delta r = r_2 - r_1$. The value of $\Delta r$ is calculated by evaluating the phase difference between the sound spectra at the two measuring points $r_1$ and $r_2$. Knowing $\Delta r$ and the signal powers $P(r_1)$ and $P(r_2)$, the desired target distance $r_1$ or $r_2$, respectively, can then be calculated from the signals of the sole sensor 2 by way of the above assumed propagation model.

It is assumed that $S(r_2, kF_G)$ and $S(r_1, KF_G)$ are sound signals at times $t_2$ and $t_1$ which have already been subjected to a Fourier transformation and are therefore displayed in the frequency domain, with $F_G$ representing the frequency resolution and k a running variable. Under the assumption that the target radiates acoustically uniformly in distance region $r_2$, $r_1$, the following results for the cross spectrum of the signals:

$$\phi_{KK}(kF_G) = S^*(r_1, kF_G) \cdot S(r_2, kF_G)$$

where S* is the conjugated complex spectrum of the discrete spectrum S. An evaluation is made of the phase spectrum $\Theta(kF_G)$ of the cross spectrum as follows:

$$\Theta(kF_G) = \text{arc } tg \frac{Im(S^*(r_1, kF_G) \cdot S(r_2, kF_G))}{Re(S^*(r_1, kF_G) \cdot S(r_2, kF_G))}$$

With knowledge of the speed of the waves which, for sound signals in air, are approximately 334 m/s in the atmosphere independent of frequency, the distance $\Delta r$ can then be calculated as follows from $\Theta(kF_G)$:

$$\Delta r = \frac{c_s}{kF_G} \cdot \frac{\Theta(kF_G)}{2\pi}$$

where $c_s$ is the speed of sound.

In this connection, it should be noted that $\Delta r$ should be selected to be $<\lambda/2$ since it is technically difficult to realize a phase determination over several zero passages. Advisably $t_2 - t_1$ is selected to be so small that $\Delta r < \lambda/2$. For real targets, such as armored vehicles and the like, target velocities of $v_z < 20$ m/s can be expected.

Then the target distance $r_1$ (and $r_2 = r_1 + \Delta r$, respectively) is determined from the two signal powers $P_2 =$ $S^2(r_2)$ and $P_1 = S^2(r_1)$ and from $\Delta r$. According to the spherical wave model, the following applies:

$$P_1 = (r_2^2/r_1^2)P_2$$

From this, the target distance is then calculated as follows:

$$r_1 = \frac{\Delta r \cdot P_2}{P_1 - P_2} \pm \sqrt{\left(\frac{\Delta r \cdot P_2}{P_1 - P_2}\right)^2 + \frac{P_2}{P_1 - P_2}(\Delta r^2)}$$

In principle, the results may be impaired by various errors, for example by non-stationary acoustic radiation from the target, errors in the propagation model, measuring errors, etc. However, an examination of the two errors that are decisive in this case, namely the error in the propagation model and the faulty determination of the phase spectrum, indicates that, in conjunction with compensatory methods (averaging methods), the described distance measuring method is suitable, for example, in the sensor system of a mine equipped with a homing fuze.

Errors in the propagation model lead to faulty results with respect to the distance; correspondingly, the distance error $\Delta F(r_1)$ in the target distance r, as a function of the error $\Delta F(P_1/P_2)$ is calculated as follows:

$$\Delta F(r_1) = \Delta r \frac{1}{P_1/P_2 - 1} +$$

$$\frac{\Delta r}{2} \cdot \frac{2\left(\frac{1}{P_1/P_2 - 1}\right)^3 + \left(\frac{1}{P_1/P_2 - 1}\right)^2}{\sqrt{\left(\frac{1}{P_1/P_2 - 1}\right)^2 + \frac{1}{P_1/P_2 - 1}}} \cdot \Delta F(P_1/P_2)$$

Figure 2:
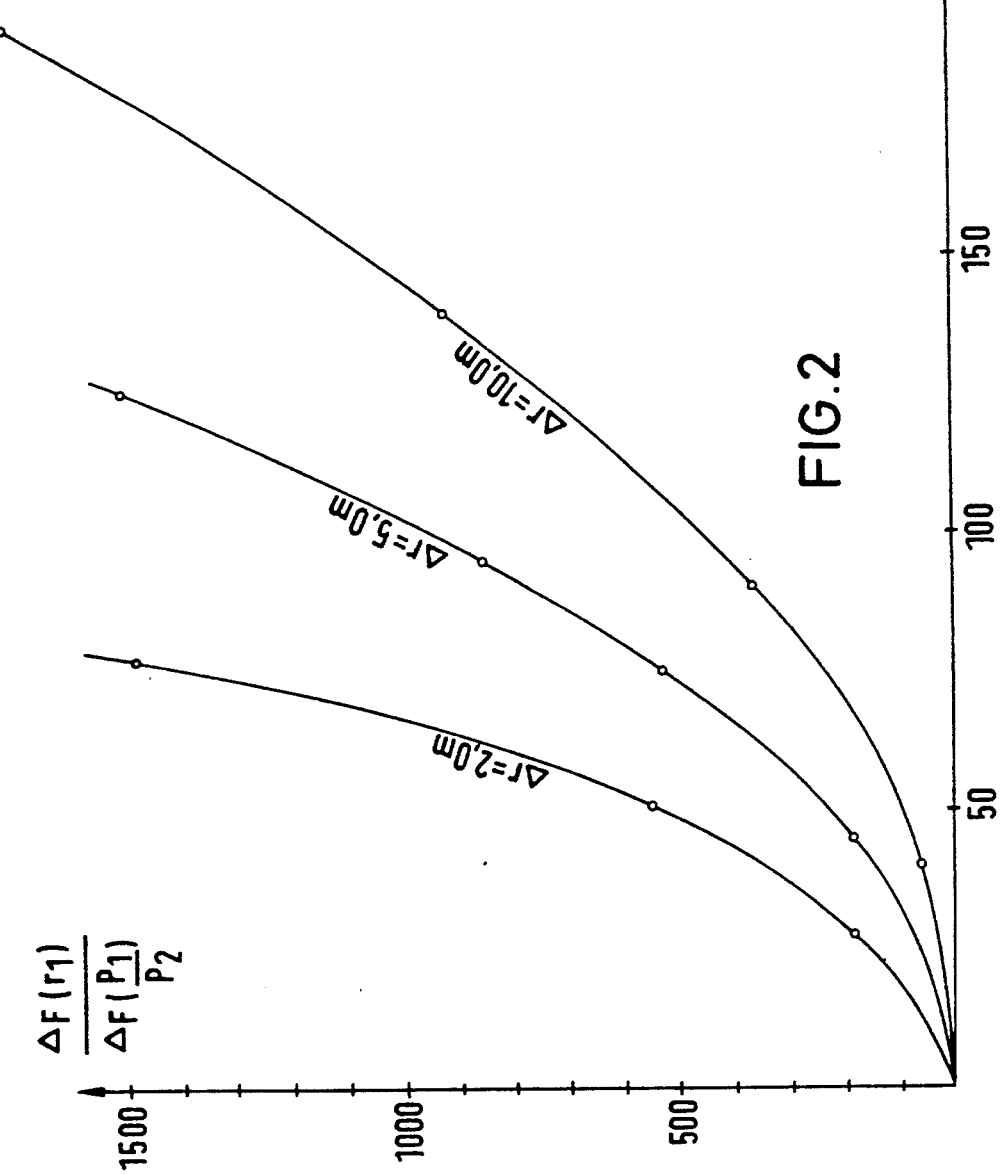

FIG. 2 shows the curve of $\Delta F(r_1)/\Delta F(P_1/P_2)$ as a function of $r_1$ and $\Delta r$.

A phase spectrum containing errors generally leads to an error $\Delta F(\Delta R)$ for path $\Delta r$. With respect to the distance $r_1$, this error can be calculated according to the following equation:

$$\Delta F(r_1) = \frac{P_2}{P_1 - P_2} + \sqrt{\left(\frac{P_2}{P_1 - P_2}\right)^2 + \frac{P_2}{P_1 - P_2}} \cdot \Delta F(\Delta r)$$

Figure 3:
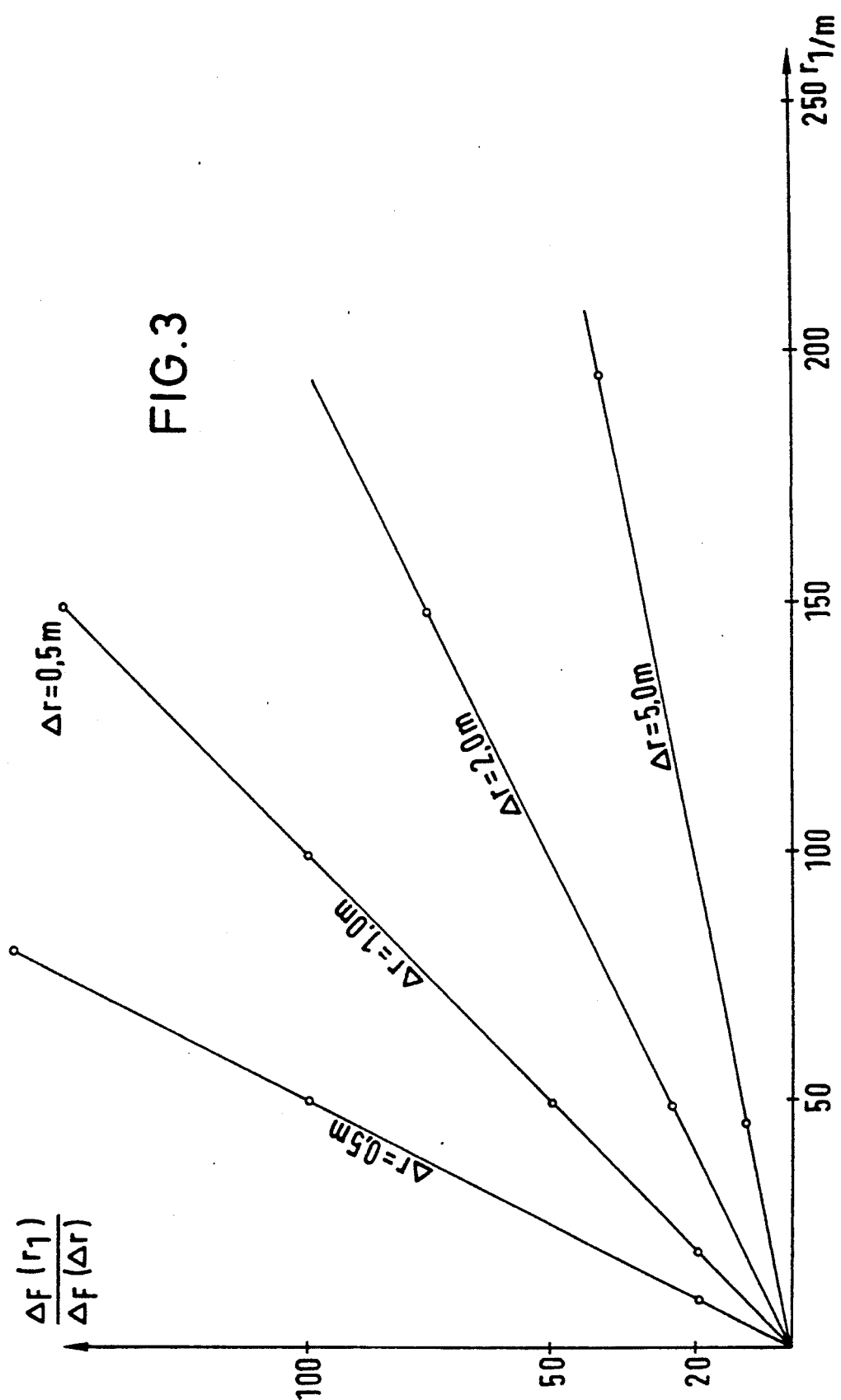

FIG. 3 shows the curves for $\Delta F(r_1)/\Delta F(\Delta r)$ as a function of $r_1$ and $\Delta r$.

In a sensor equipped with a corresponding electronic evaluation system in which, according to requirements, the determined values are possibly subjected to a compensation process, the circuit arrangement for establishing the Fourier series may additionally be employed for the evaluation of the signals from bearing sensors which are generated, for example, by the acoustic sensor. The electronic evaluation system may include an appropriately programmed microprocessor. The acoustic sensor may be given a low structural volume and is robust and particularly suitable for use in mine and reconnaissance sensor systems.

It will be understood that the above description of the present invention is susceptible to various modifications, changes and adaptations, and the same are intended to be comprehended within the meaning and range of equivalents of the appended claims.

What is claimed is:

1. A method of determining the target distance of sound generating targets from acoustic signals that are subjected to a Fourier transformation, comprising the steps of: receiving acoustic signals with an acoustic sensor at two successive points in time from a target that is at a first distance $r_1$ and a second distance $r_2$, respectively, from the acoustic sensor; subjecting the received acoustic signals to a Fourier transformation to provide respective transformed acoustic signals; determining the phase difference in the sound spectrum of the transformed acoustic signals and evaluating the phase difference in the sound spectrum to yield the difference between the distances of the target from the sensor at the two points in time; and, calculating the target distance from the difference between the distances according to the spherical wave model.

2. A method according to claim 1, further comprising subjecting the calculated target distance to error compensation with respect to the error in the propagation model and/or the faulty determination of the phase difference of the sound spectrum.

3. A method according to claim 1, including selecting the distance between the points in time to be so small that the difference between the distances of the target from the sensor is less than one-half the wavelength of the received acoustic signals.

4. A method according to claim 2, including selecting the distance between the points in time to be so small that the difference between the distances of the target from the sensor is less than one-half the wavelength of the received acoustic signals.

5. An acoustic sensor arrangement for determining the target distance of sound generating targets from acoustic signals, the sensor arrangement comprising: an acoustic sensor for receiving acoustic signals produced by a target; and an electronic evaluation system which includes a Fourier transformation circuit and which is configured such that the acoustic signals received by said acoustic sensor at two successive points in time from a target that is at a distance $r_1$ and $r_2$, respectively, from said acoustic sensor are employed, after the Fourier transformation, for an evaluation of the phase difference in the sound spectrum which yields the difference between the distances of the target from the sensor at the two points in time, from which difference the target distance is then calculated according to the spherical wave model.

6. A method according to claim 1, wherein the target is a wheeled of track-laying vehicle.

7. An acoustic sensor arrangement according to claim 5, wherein the target is a wheeled or track-laying vehicle.

* * * * *